Dec. 13, 1949  F. A. MULLER  2,490,827
METHOD OF AND MEANS FOR MEASURING IMPEDANCE
Filed Aug. 14, 1945  3 Sheets-Sheet 1

INVENTOR
Fred A. Muller
BY
ATTORNEY

Dec. 13, 1949     F. A. MULLER     2,490,827
METHOD OF AND MEANS FOR MEASURING IMPEDANCE
Filed Aug. 14, 1945     3 Sheets-Sheet 2

INVENTOR
Fred A. Muller
BY
ATTORNEY

Dec. 13, 1949  F. A. MULLER  2,490,827
METHOD OF AND MEANS FOR MEASURING IMPEDANCE
Filed Aug. 14, 1945
3 Sheets-Sheet 3
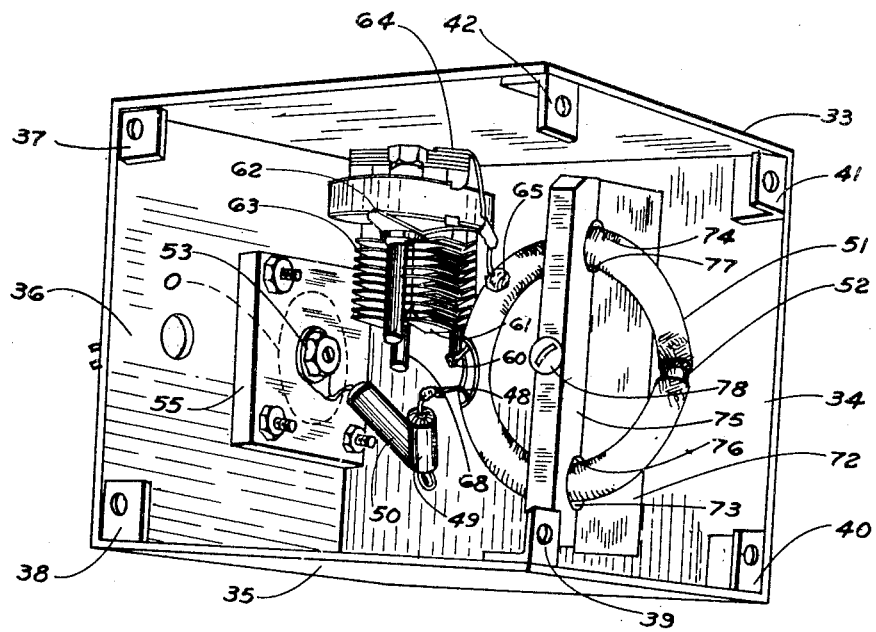
INVENTOR
Fred A. Muller
BY
ATTORNEY Patented Dec. 13, 1949

2,490,827

UNITED STATES PATENT OFFICE 2,490,827

METHOD OF AND MEANS FOR MEASURING IMPEDANCE

Fred A. Muller, Newark, N. J., assignor to Federal Telephone and Radio Corporation, New York, N. Y., a corporation of Delaware Application August 14, 1945, Serial No. 610,857

2 Claims. (Cl. 175—183)

This invention relates to the determination of the characteristic impedance of a wave transmission line, and has for its principal object to provide a system and method whereby the characteristic impedance of a line may be determined by a simple operation.

It is often desirable to know the characteristic impedance of a wave train transmission line such as a coaxial cable, which is ordinarily substantially a pure resistance. The characteristic resistance of a moderately short length of line, however, is not readily ascertainable merely by making a measurement at its input end, for the reason that the impedance seen at the input is dependent on the impedance terminating the remote end of the line; and the characteristic resistance can be measured most readily and accurately at the input end when the remote end of the line is correctly terminated by the characteristic resistance. Since the characteristic resistance is the unknown quantity which it is desired to learn, it is of course not possible to select the proper termination prior to measurement.

According to my invention, I provide a simple arrangement whereby the characteristic resistance of a line such as a high frequency coaxial cable can readily be ascertained by a simple manipulation; and the characteristic resistance can be read directly on a scale, if desired. I carry out my invention by use of a Wheatstone bridge type of circuit to the input terminals of which I apply an alternating voltage of the frequency at which it is desired to ascertain the characteristic resistance of the line. One of the bridge arms contains a variable resistance element, and another is connected to the input of the transmission line whose characteristic resistance is to be measured. The remote or output end of the line under measurement is terminated in another variable resistance, and the two variable resistances can be varied together. The magnitude of these resistances at the condition of bridge balance is the characteristic resistance of the line.

A feature of my invention is the use of variable resistance elements of the type described and claimed in Nordlin application Serial No. 601,395, filed June 25, 1945, now Patent No. 2,474,272, issued June 28, 1949. By coupling the adjusting members of these devices together, they can be operated in unison by a uni-control arrangement so as to vary the resistances of both devices simultaneously while maintaining both at the same resistance value; and the resistance value can be read on a dial.

The foregoing and other features and advantages of my invention will be better understood by reference to the following detailed description and the accompanying drawings of which:

Fig. 4 illustrates a portion of the interior of the box of Fig. 3;

Fig. 6 shows the relative positions of the elements in the box; and

Figure 1:
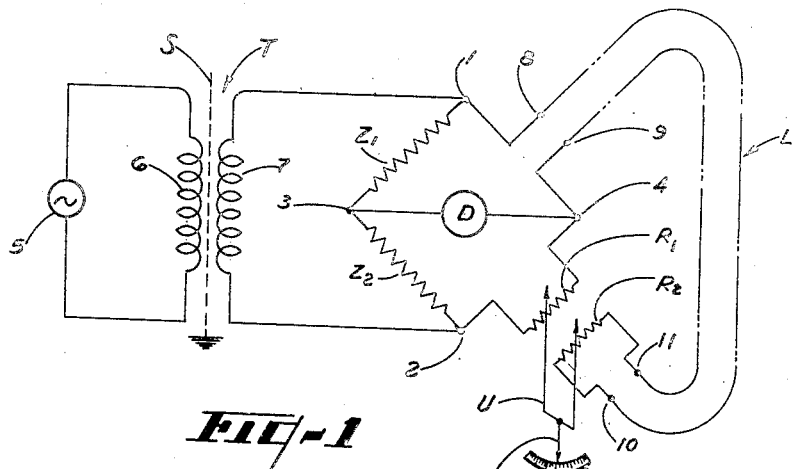
Fig. 1 shows a system for making measurements according to my invention.

Fig. 1 shows a bridge circuit system for making a characteristic resistance measurement on a transmission line. The bridge comprises the input terminals 1 and 2 and the output terminals 3 and 4. Alternating voltage is supplied to the input terminals by means of alternating voltage source 5, through an input transformer T, comprising the primary coil 6 and the secondary coil 7, which is connected across the input terminals 1, 2. A grounded shield S may be placed between the primary and secondary coils, if desired, as is common in high frequency work. Two of the bridge arms, connected in series between the input terminals 1, 2 are equal impedances $Z_1$ and $Z_2$. A third arm of the bridge is a variable resistor $R_1$. The fourth arm of the bridge contains the input terminals 8, 9 of a transmission line L, whose characteristic resistance is to be measured. The output terminals 10, 11 of the line L is terminated by a variable resistance $R_2$. The variable resistance elements $R_1$ and $R_2$ are similar to each other in that their resistance values are made to vary in unison by a uni-control device U, so as to maintain their resistance values equal at all adjustments. The arm or pointer 12 of this device is adapted to read on a scale 13 the value of the resistance to which each of the resistance elements is adjusted. A detector or null indicator D is connected across the output terminals 3 and 4 of the bridge to indicate the condition of bridge balance.

Figure 2:
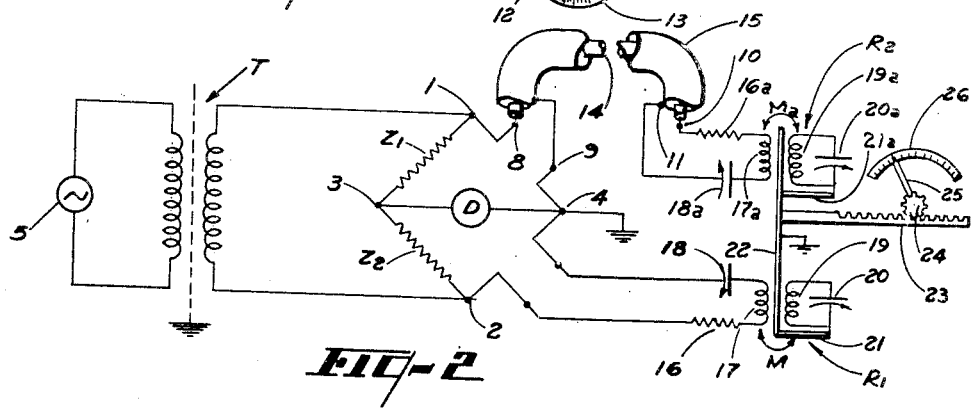
Fig. 2 shows a system like that of Fig. 1, arranged to measure the characteristic resistance of a coaxial cable, by the use of adjustable networks constituting variable resistances.

The system of Fig. 2 is like that of Fig. 1 except that the transmission line, whose characteristic resistance is under measurement is shown specifically as a coaxial cable, for example the air dielectric type, comprising an inner conductor 14 and an outer conductor 15, the inner conductor being connected to terminal 8 and the outer conductor to terminal 9 at the bridge. The particular variable resistance device R₁ in Fig. 2 is a network having a primary circuit and a secondary circuit, having an adjustable mutual coupling therebetween. The primary circuit has its input connected to terminals 2 and 4 of the bridge, and comprises in series a resistor 16, an inductive loop 17, and a variable condenser 18. The secondary circuit comprises secondary coil 19 shunted by variable condenser 20. The primary and secondary coils 17 and 19 are placed in inductive relation with each other, with a variable mutual inductance M between them.

The network R₂ in Fig. 2 is similar and comprises elements similar to those in the network R₁, the corresponding elements being given the same numbers except that in network R₂, the numbers bear the subscript $a$.

The secondary coils 19 and 19a are arranged to be movable relative to the primary coils 17 and 17a respectively, so as to vary the mutual inductances M and M$_a$. For this purpose the secondary circuits are shown mounted on respective bases 21 and 21a which are shown arranged as parts of grounded shielding arrangements, and these bases are interconnected by a common member 22 so that when the common member is moved, both secondary circuits move in unison. For the purpose of making the movement, there is shown attached to member 22 a ratchet device 23, the longitudinal movement of which turns a pinion 24, provided with a pointer 25 adapted to move around a dial 26. Thus, changes in the degree of coupling between the primary and secondary circuits is indicated by a corresponding indication on the dial.

The variable resistance devices R₁ and R₂ of Fig. 2 are the type described and claimed in the said co-pending application of Nordlin, Serial No. 601,395, filed June 25, 1945, which is designed especially for ultra-high frequencies within the range, for example, of about 50 to 200 megacycles per second. According to standard circuit analysis, the input impedance Z looking into the primary circuit of either of these networks R₁ and R₂ is given by the equation:

$$Z = R_p + jX_p + \frac{\omega^2 M^2}{R_s + jX_s} \quad (1)$$

where:

$R_p$ is the total primary circuit resistance
$jX_p$ is the total primary circuit reactance
$R_s$ is the total secondary circuit resistance
$jX_s$ is the total secondary circuit reactance
$\omega$ is $2\pi$ times the frequency
M is the mutual inductance between the primary and secondary coils.

When condensers 18 and 20 are adjusted so that the primary and secondary circuits are each made to have zero reactance at the frequency on the line, Equation 1 becomes:

$$Z = R_p + \frac{\omega^2 M^2}{R_s} \quad (2)$$

Accordingly, the input impedance Z is a pure resistance consisting of the total primary circuit resistance plus the resistance reflected into the primary circuit from the secondary circuit. This reflected resistance increases with increase in the inductive coupling. Accordingly, the input impedance Z is a pure resistance which can be varied by varying the coupling.

Figure 3:
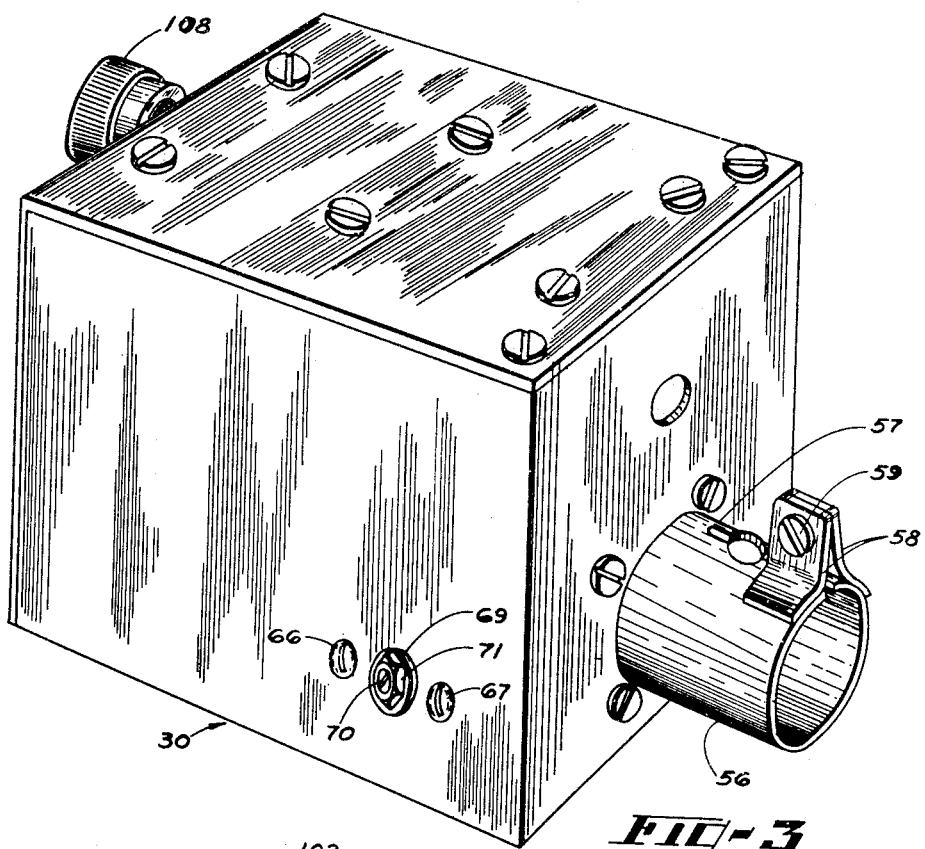
Fig. 3 shows a box arrangement containing a variable resistance network of the type illustrated schematically in Fig. 2.
Figure 5:
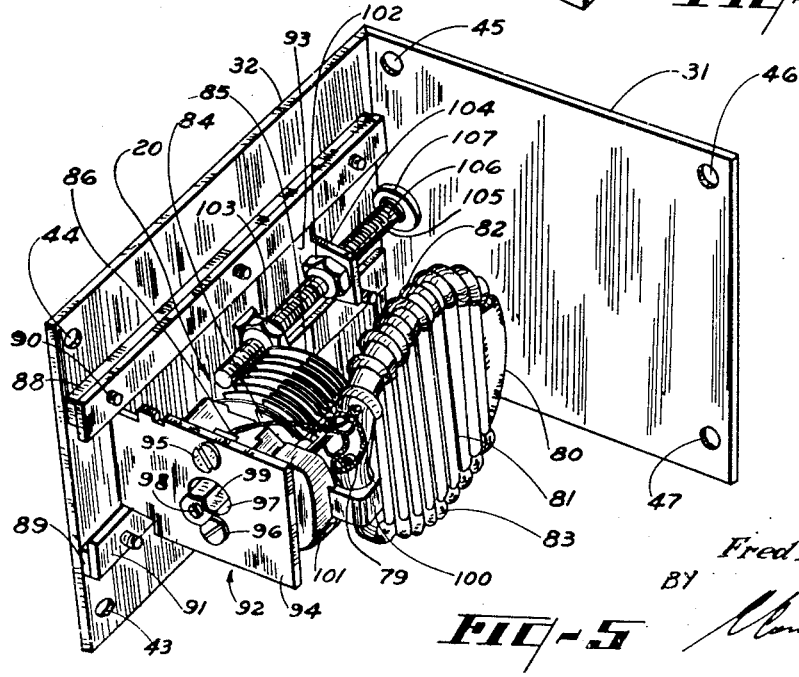
Fig. 5 shows the remaining interior portion of the box of Fig. 3, adapted to fit with the portion shown in Fig. 4.

In Figs. 3 to 6, I show a preferred construction for each of the networks R₁ and R₂ of Fig. 2, this being a construction particularly applicable for use at ultra-high frequencies. This is the construction for the variable resistance network described and claimed in said Nordlin application Serial No. 601,395. The elements are shown placed in a six-sided compartment or box 30 of conducting material which provides a shielding effect. It will be understood, however, that some other suitable shape might be chosen instead if desired. In Figs. 4 and 5, the box is shown with two of its sides 31 and 32 separated from the remaining four sides 33, 34, 35 and 36. The open ends of the four sides shown in Fig. 3 are provided with angle pieces 37, 38, 39, 40, 41 and 42, through each of which a hole is drilled and tapped to receive suitable fastening screws placed through respective holes 43, 44, 45, 46 and 47 (the last hole for engagement with angle piece 42, not being visible on the drawing).

The primary circuit elements are mounted within the box portion in Fig. 4. The primary inductance is single loop 48 connected at one end in series with resistors 49 and 50, these resistors together constituting the resistance 16 in Fig. 2; these resistors are preferably the non-inductive carbon type. The loop 48 may be made from a length of flexible coaxial cable the outer conductor of which is preferably of a braided metal construction to act as a grounded shield 51 to prevent undesired stray capacitive couplings. A gap is provided in this shield at the insulating spacer 52; this gap provides a desired discontinuity in the shield. The second of the series-connected resistors, 50, is connected to the terminal 53 of the terminal plug 54 centrally fastened through insulating block 55 covering hole O through wall 36, so that the plug protrudes outwardly through the hole from the box, as shown in Fig. 6.

A cylindrical coupling member 56 is mounted on the outside of wall 36 concentrically surrounding plug 54 and fitted to hole O; and the inner circular end of the coupling member is suitably fastened to wall 36 for example by brazing or welding. The coupling 56 is of the proper internal diameter so that it will nicely receive the outer cylindrical conductor 15 of the coaxial line. The coupling is provided with a longitudinal slot 57; and a pair of tightening flanges 58 are formed from the member on either side of the slot so that a fastening nut and bolt 59 may be attached through the holes to tighten the coupling member around the outer sheath of the coaxial line, while the inner conductor 14 of the coaxial line is attached to plug 54. For this latter purpose, a coaxial hole should be drilled into the end of conductor 14 to receive the plug 54.

The end of loop 48 opposite from the resistor 49 is connected in series to terminal 60 of stator plates 61 of the variable condenser 18. The terminal 62 of the movable condenser plates 63 is grounded to the box at the condenser mounting 64, and is also connected at 65 with the braided shield 51 which is located concentrically around loop 48. The two mounting screws 66 and 67 for the condenser are brought through the box wall 33. The rotor shaft 68 is brought through a hole 69 in the same wall and the outer end of this shaft is made practically flush with the outer surface of the wall and the end of the shaft is slotted at 70 to receive a screw driver for turning the rotor. A lock nut 71 holds the rotor in position after the adjustment is made.

The shielded loop 48 is mounted in a fixed position by a mounting block 72 suitably fastened to wall 34. This mounting block is provided at its outer edge with a pair of semi-circular cutouts 73 and 74 suitably spaced and dimensioned to receive the shield 51. A corresponding fastening block 75, provided with corresponding cutouts 76 and 77, is fastened to block 72 by fastening screw 78.

The secondary circuit elements shown in Fig. 5 comprise the secondary loop 79 enclosed in the braided concentric shield 80, this shielded loop being similar in dimensions and construction to the primary shielded loop 48. For shielding purposes, there is placed across the shield 80 a grid 81 composed of spaced wires of high electrical conductivity such as copper. These grid wires may conveniently be looped around one side of the shield 80 as shrown at 82 and individually soldered to the shield at their ends as shown at 83. The loop 79 is closed through the variable condenser 20 comprising a set of stator plates 84 and a set of rotor plates 85. The lead 86 from one end of loop 79 is connected to the stator plates and grounded to the frame at the stator mounting lug 87, and the other end of loop 79 is connected to the rotor terminal and grounded shield 80.

The secondary loop and condenser are mounted so that together they may be moved relative to the side 32 of the box. For this purpose, the inside surface of side 32 is provided with a track comprising a pair of spaced strips 88 and 89, over which are fastened respectively strips 90 and 91. Strip 90 has its inner edge overlying strip 88 and strip 91 has its inner edge overlying strip 89.

The loop and condenser are mounted on an angle member 92 having one flat portion 93 adapted to be fitted within the track between strips 88 and 89 and held under the overlying edges of strips 90 and 91; and having the other portion 94 extending upright at a right angle from portion 93. By this arrangement portion 93 can be moved longitudinally along the track.

The condenser is supported directly on angle portion 94 by means of suitable screws 95 and 96 which hold the stator pillars. The rotor shaft is extended through a hole 97 in member 94, and the end of the shaft is slotted at 98. A lock nut 99 is provided to hold the rotor against movement in any desired position. The shielded loop is mounted in a bracket 100 which is bolted to the insulation mounting 101 of the condenser.

For the purpose of sliding the secondary assembly relative to plate 32, the angle member 93 has attached to it a pair of spaced threaded members 102 and 103. This attachment may be made in any suitable manner, for example by soldering or welding the nut 102 to a strip 104 which is welded to plate 93; and by directly soldering or welding nut 103 to the plate 93. A threaded bolt 105 provided with a collar 106 passes through opening 107 through wall 31 and through the threaded members 102 and 103; and a convenient knob 108 also provided with a collar to prevent endwise movement of the bolt is attached to the bolt outside the box as shown in Fig. 3. By turning the handle 108, the secondary assembly can be slowly slid one way or the other relative to side member 32.

When the structure of 4 and 5 are put together and the box finally assembled as shown in Fig. 3, the secondary loop 79 will be situated just above the primary loop 48 and will be slightly separated from each other, for example, about ⅞ inch. The planes of the loops will be parallel with each other as indicated in Fig. 6. When the secondary loop is directly over the primary loop, maximum coupling M will exist. Rotation of handle 108 will move the secondary coil away from this position of maximum juxtaposition and thereby reduce the coupling and consequently reducing the resistance seen at the primary input.

In operation, the primary and secondary circuits will first be independently tuned to the frequency of the voltage impressed on the line, by independent adjustments of the respective primary and secondary condensers. When these independent adjustments for zero reactance are obtained, the lock nuts of the condensers may be set to hold the adjustment. With the device coupled to the end of the coaxial line by attachment of the line to members 54 and 56 there is provided a termination for the line which is substantially a pure resistance.

Suitable dimensions for the network are given in the said co-pending Nordlin application, for a specific application to a coaxial line having a characteristic resistance in the range of about 50 to 75 ohms at frequencies in the order of about 75 to 100 megacycles per second. Such suitable values are:

Value of resistor 16_____ 28.5 to 41.1 ohms
Diameter of loops 48 and 79____ 1⅝ inches
Spacing between loop planes__ ⅞ inch
Maximum capacity of variable condensers _____ 50 µµf With such a construction, the range of resistance over which the adjustment can be made by varying the coupling is about 27 ohms. The particular values of minimum and maximum resistance of this range will of course depend on the particular value of resistor 16, which may be selected; and this will be chosen according to the characteristic resistance of the line.

Figure 7:
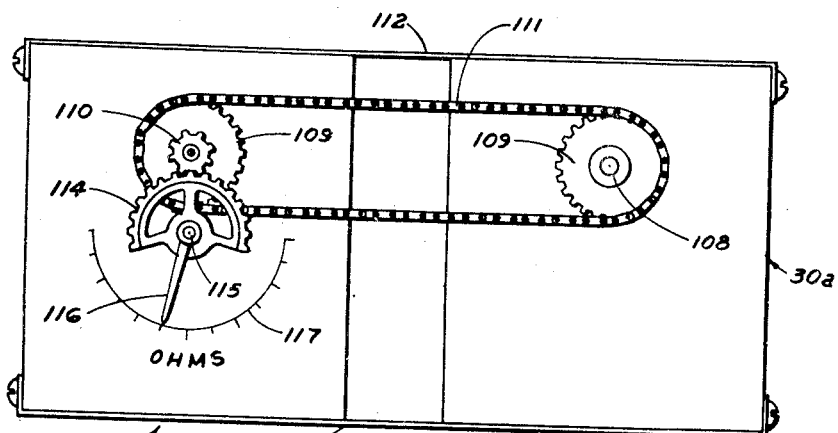
Fig. 7 shows a pair of the variable resistance devices of the type shown in Fig. 3, geared together by a uni-control mechanism.

Fig. 7 shows an arrangement whereby two of the resistance devices constructed as shown in Fig. 3 are arranged side by side to operate in accordance with the system of Fig. 2. The device representing $R_1$ in Fig. 2 is marked 30 in Fig. 7 and the device representing $R_2$ in Fig. 2 is marked 30a in Fig. 7, although it will be understood that devices 30 and 30a are substantially the same, except for the mechanical constructions shown on the rear walls in Fig. 7. Device 30a has a gear wheel 109 attached to its shaft 105 just under the knob 108. The device 30 has a similar gear wheel 109, and has a pinion 110 in place of the knob 108. The two gear wheels 109 are interconnected by a chain drive 111, and to maintain the chain in a proper spaced relation, the two devices 30 and 30a are held in the spaced relation by strips 112 and 113. The pinion 110 is geared to a relatively large gear segment 114 pivoted at 115 and carrying a pointer 116 attached to produce an indication on an ohmic scale 117.

With this arrangement, the manual turning of knob 108 turns the shafts 105 of both the resistance devices at the same rate when the gear wheels 109 are the same, and the turning of the shafts produces a relatively slow turning of the pointer 116. As the resistance values of the devices 30 and 30a vary in accordance with the turning of the knob 108, the resistance of each device can be read directly on the ohmic scale 117.

In the operation of the systems of Figs. 1 and 2, the values of the resistance devices $R_1$ and $R_2$ are adjusted by the single control element until the detector D indicates the condition of bridge balance by showing zero voltage between the output terminals 3 and 4. Since impedances $Z_1$ and $Z_2$ are equal, the condition of bridge balance will indicate that the input resistance to the line at terminals 8 and 9 is equal to the resistance $R_1$. The input resistance of the line will only be equal to $R_1$ when the line terminating resistance $R_2$ is equal to the characteristic resistance of the line. In consequence, the value of resistance $R_2$ at the condition of bridge balance is the characteristic resistance of the line and can be read directly on the ohmic scale in terms of ohms.

From the foregoing description and explanation of my invention, it will be seen that I have provided a simple and efficient way of quickly ascertaining the characteristic resistance of a line by a simple manipulation. The particular embodiments described herein are merely illustrative of a preferred form of the invention and do not limit the invention, the scope of which is limited only in accordance with the appended claims. Modifications may readily suggest themselves; for example, the impedance elements $Z_1$ and $Z_2$, which in the usual preferred case will be pure resistances, need not necessarily be placed in the two adjacent bridge arms extending between the input terminals 1 and 2. Instead, they may, if desired be placed in any other positions of the bridge which will still permit a bridge balance to be obtained according to the well established principles of bridge operation. For example, the elements $Z_1$ and $Z_2$ might be connected between terminals 1, 3 and terminals 1, 4 respectively, in which case the input to the line and the resistance element $R_1$ will be connected respectively in the remaining two bridge arms.

The maximum sensitivity of the system will ordinarily be had when the length of the transmission line used for the measurement is made to be approximately an odd number of quarter wave lengths long; although it will be understood that the measurement is not limited to the use of any particular length of line.

I claim:

1. Means for ascertaining the characteristic impedance of an electric wave transmission line, comprising a bridge having four arms with a pair of input terminals and a conjugate pair of output terminals, a source of alternating voltage connected across the input terminals and a detector connected across the output terminals, two of the bridge arms comprising impedance elements, a third arm comprising an adjustable resistance element, the fourth arm comprising terminals for connection with one end of said line, and a second adjustable resistance element comprising terminals for connection with the other end of said line, said resistance elements both being controlled simultaneously by a single control element, the movement of which varies the resistance values in a predetermined ratio dependent upon the impedance ratio of said two impedance elements.

2. Means for ascertaining the characteristic impedance of an electric wave transmission line, comprising a bridge having four arms with a pair of input terminals and a conjugate pair of output terminals, a source of alternating voltage and a detector connected across the output terminals, one branch of the bridge consisting of two adjacent arms, each consisting of an impedance element, arranged in series between the input terminals, said impedance elements being of equal value, the other branch of the bridge between the input terminals consisting of the remaining two adjacent arms, one of which consists of an adjustable resistance element and the other of which consists of the input terminals for connection with one end of said line, a second adjustable resistance element comprising terminals for connection with the other end of said line, and a single control means for adjusting the two resistance elements in unison to vary their resistance values while maintaining said resistance values equal.

FRED A. MULLER.

REFERENCES CITED

The following references are of record in the file of this patent:

UNITED STATES PATENTS

| Number | Name | Date |
| --- | --- | --- |
| 1,665,397 | Wunsch | Apr. 10, 1928 |
| 2,323,076 | Paul | June 29, 1943 |
| 2,326,081 | Van Wynen | Aug. 3, 1943 |